April 30, 1963 J. H. HINKLE, JR 3,087,602
CONVEYOR APPARATUS

Filed May 25, 1960 2 Sheets-Sheet 1

John H. Hinkle, Jr.
INVENTOR.

BY *Carl B. Fox, Jr.*

ATTORNEY

April 30, 1963  J. H. HINKLE, JR  3,087,602
CONVEYOR APPARATUS
Filed May 25, 1960  2 Sheets-Sheet 2
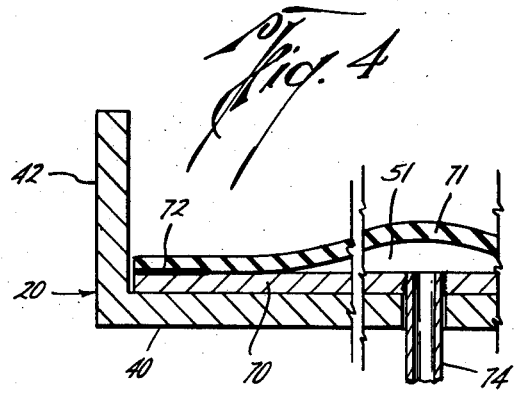
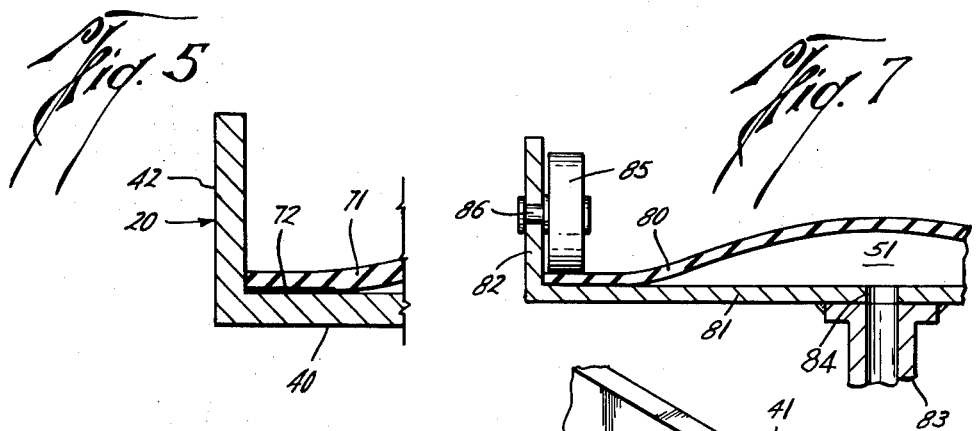
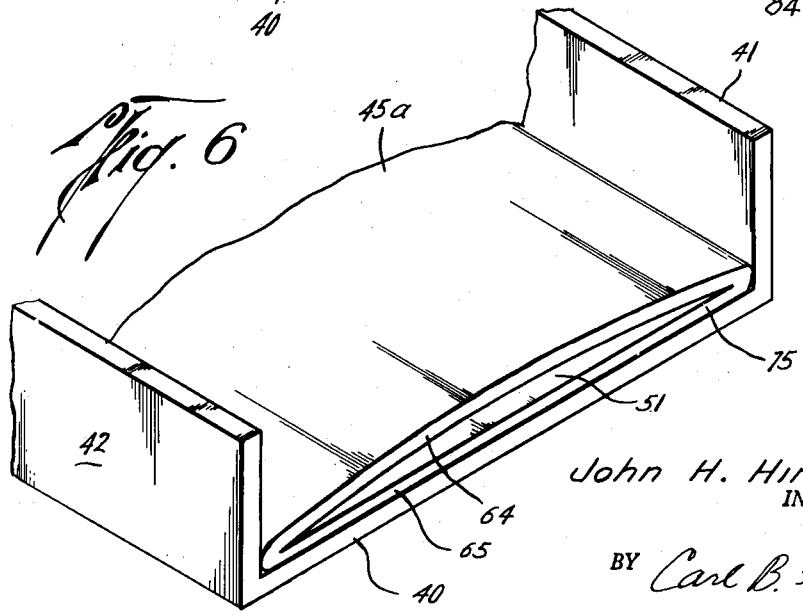
John H. Hinkle, Jr.
INVENTOR.
BY Carl B. Fox, Jr.
ATTORNEY

3,087,602
CONVEYOR APPARATUS
John H. Hinkle, Jr., Harris County, Tex., assignor, by mesne assignments, to Hooker Chemical Corporation, New York, N.Y., a corporation of New York
Filed May 25, 1960, Ser. No. 31,672
12 Claims. (Cl. 198—220)

This invention pertains to conveying apparatus and, more particularly, to conveying apparatus especially for use in conveying materials of sticky, cohesive, properties.

A principal object of the invention is to provide conveying apparatus which is not subject to failure of operation because of setting up or hardening, or sticking, of the material being conveyed.

A second principal object of the invention is to provide conveying apparatus for conveying sticky cohesive materials.

Other objects of the invention are to provide such conveying apparatus which is of low cost and is reliable, and which may be readily provided, if desired, by simple modifications to existing apparatus.

Briefly, the invention contemplates providing on surfaces of conveyor apparatus along which material is conveyed flexible coverings movable by air or other gas or liquid introduced therebeneath to break up and dislodge materials stuck together or to the apparatus. In the preferred form of apparatus, to be described, the apparatus is disposed in such a manner that a relatively small amount of air is used to distend the flexible covering, the air, or "bubble" of air, moving lengthwise of the conveyor to break loose and dislodge stuck material over the complete length of the conveyor.

Other objects and advantages of the invention will appear from the following detailed description of preferred embodiments of the invention, reference being made to the accompanying drawings thereof, of which:

FIGURES 4 and 5 are partial transverse sections of two additional modified forms of apparatus according to the invention;

FIGURE 6 is a perspective end view of still another modified form of apparatus according to the invention; and, FIGURE 7 is a vertical cross section taken laterally across a modified form of apparatus wherein the invention is applied to a continuous belt conveyor.

Figure 1:
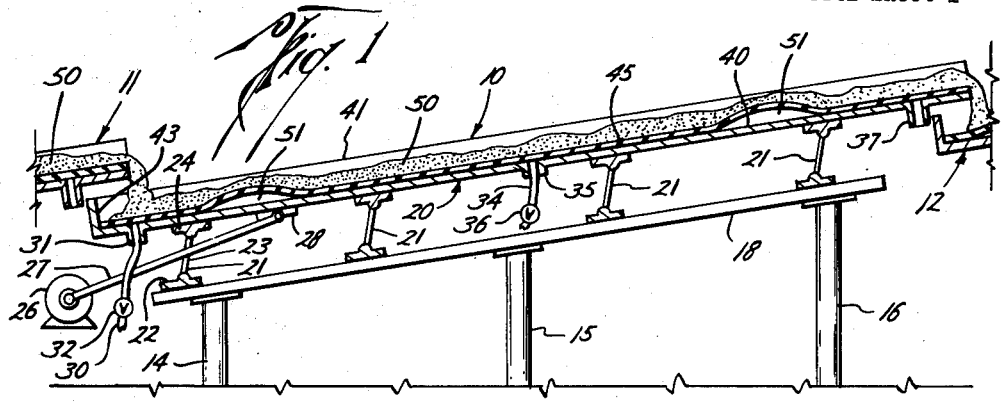
FIGURE 1 is a vertical section taken along the longitudinal centerline of apparatus of preferred form according to the invention.
Figure 2:
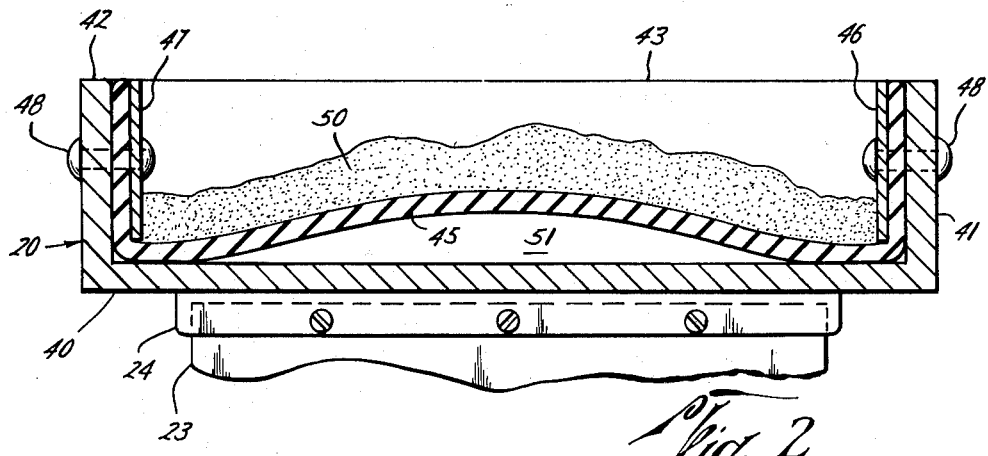
FIGURE 2 is a transverse section of the apparatus of FIGURE 1, taken at line 2—2 of FIGURE 1.

Referring now to the drawings in detail, and first to FIGURES 1 and 2, there is shown a vibratory, or vibrating, conveyor indicated generally by reference numeral 10. Conveyor 10 is flanked at either end by similar or identical conveyors 11, 12, conveyor 10 receiving discharged material from conveyor 11 and discharging to conveyor 12.

Conveyor 10 includes support legs 14, 15, 16 or other suitable supporting means; support or table 18, which may be inclined upwardly toward the right or discharge end as shown in FIGURE 1, or which may be level, or which may be inclined downwardly toward the discharge end, or other suitable longitudinal supporting structure; trough or pan 20 usually of narrow elongate form; and a plurality of spaced mounting springs 21, or other suitable flexible or pivotal mounting means for the pan 20.

Plate springs 21, as shown, each include a lower bracket 22 secured by bolting, welding, or the like, to support 18, a flexible spring element 23 of resilient flat plate form held by a bracket 22, and an upper bracket 24 secured to the under side of pan 20 in any suitable manner, and holding the upper edge of spring element 23. Thus, trough or pan 20 is supported above table 18 for reciprocating vibratory motion longitudinally, flexure of the plate springs permitting such motion.

A vibration producing device 26 has connection through rigid shaft 27 with bracket 28 suitably mounted at the undersurface or other part of pan 20, so that longitudinal reciprocating vibrations can be imparted to pan 20 by device 26. The vibrations in vibratory conveyors are of the "jigging" type, with the forward movements slow enough that the material conveyed is carried along without substantial slippage and with the backward movements rapid enough to cause substantially complete slippage and no backward material movement so that the material is vibrated or "jigged" along the conveyor. Such conveyors have, therefore, been termed "jigging" conveyors as well as vibratory conveyors as they are commonly termed in the art.

The invention hereby presented, however, is not limited to conveyors of the vibratory or jigging type, and can be equally suitably applied in other types of conveyors having flat beds or pans, or flat bed or pan sections, over which the conveyed material is moved. The description of the vibratory conveyor presented above is, therefore, made to complete the description of the preferred embodiments, and does not limit the scope of the invention to that single type of conveyor.

Conveyor 10, therefore, may be modified in form and in mode of material movement, such as continuous or intermittent monodirectional or reversible movements of pan 20, within the bounds of the invention.

Still referring to FIGURES 1 and 2, showing a preferred embodiment of the invention to illustrate the invention, pan 20 has an air (or other gas) inlet provided by hose 30 connected between a suitable air (or other gas) supply, not shown, and an inlet connection 31 providing a hose connection and communication through the bed of pan 20 from within the hose. A valve 32 of either manual or automatic type is provided in hose 30. Other such inlets may be provided at spaced intervals along pan 20, such as the second such inlet provided by hose 34, inlet connection 35, and valve 36. At the opposite end of pan 20 (the righthand end thereof as depicted in FIGURE 1) there is an air (or fluid) outlet 37 providing an exit downwardly from above the bed of pan 20 to therebelow.

Trough or pan 20 includes the bed 40 thereof previously referred to, parallel opposite vertical sides or sidewalls 41, 42, which may be integral as shown in the drawings or separate and suitably connected at the opposite longitudinal sides of the bed, and an end or end wall 43 similarly formed or provided at the "feed" end of pan 20 at the left-hand end thereof as shown in FIGURE 1. The bed serves as a surface along which material is conveyed and the side and end walls serve to retain material thereon.

A layer or sheet 45 of flexible material is disposed to cover bed 40 forming the inside bottom of trough 20. As is better shown in FIGURE 2, sheet 45 extends over bed 40 and up along the inner surfaces of sides 41, 42. The vertical side portions of sheet 45 are held clamped between the side walls and strips 46, 47 by a plurality of rivets 48 through suitable perforations thereof.

Sheet 45, as has been stated, is flexible, and may also be elastomeric and resilient although these latter properties are not essential. Flexibility is necessary so that sheet 45 may be flexed upwardly, at least slightly from bed 40 by air, other gas, or liquid introduced therebeneath, as will be further explained. Therefore, sheet 45 may be formed of any material which may be formed in a reasonably thin sheet, and which has sufficient flexibility that it may be flexed upwardly from a relaxed position flush against the bed. Suitable materials include, rubber, neoprene, sheet metal, plastics, and the like. It is preferred that the material be corrosion resistant and/or abrasion resistant if the conditions of operation so demand.

In operation of the apparatus shown in FIGURES 1 and 2, the subdivided material being conveyed, designated by reference numeral 50, is discharged from the end of conveyor 11 to drop onto the feed or entrance end of conveyor 10, and subsequently the material is delivered in the same manner to conveyor 12. Conveyors 10–12 will usually be of the same type. However, any conveyor 10–12 may be used alone or in conjunction with different or like conveyors.

Hose 30 extends from a pressured air source, for example, and, when valve 32 is opened pressured air passes to beneath sheet 45 above connection 31. The air is preferably admitted intermittently, only enough air to form a "bubble" 51 being required. Valve 32 is closed after the bubble is formed. Bubble 51 is subjected to the pressure caused by the weight of sheet 45 thereabove and additionally to the pressure caused by the weight of any material 50 on the sheet and above the bubble. The bubble 51 is preferably sufficient in size to extend substantially completely laterally across the bed so that side, as well as center, portions of sheet 45 will be flexed to some degree.

Vibration producing means 26 causes suitable vibration of pan 20 to cause motion of material 50 therealong from the left to right according to the showing of FIGURE 1. This product movement, together with the fact that each of the bubbles 51 is also acted on by the vibrations, causes each bubble 51 to be moved from the point of origin thereof above connection 31 (or 35) to the outlet 37. Thus, for each burst of air introduced at inlet 31, a bubble 51 is formed which moves along beneath sheet 45 to outlet 37, where the air or gas escapes thereby abolishing the bubble.

It will be evident that each such movement from one end of the conveyor to the other will tend to free any material 50 which might be clinging to sheet 45 at any point along its length, and at the same time break up any material 50 which might be formed together in a mass on the conveyor. Hence, the structure described provides apparatus suited for handling of sticky, gummy materials not heretofore manageable in connection with the general type of equipment which has been described.

Figure 3:
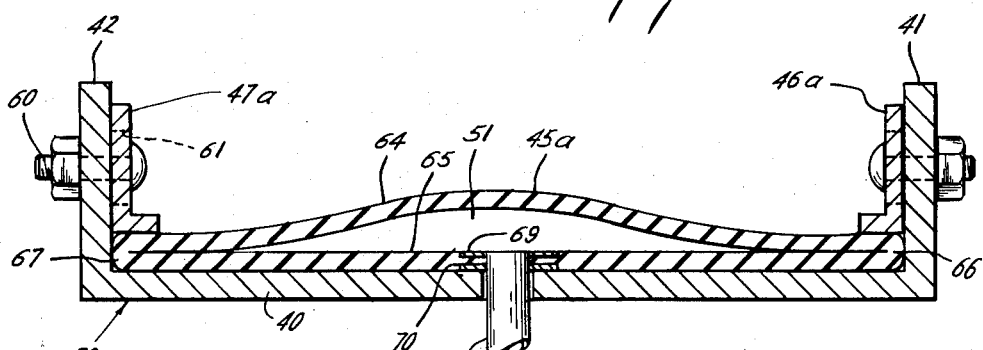
FIGURE 3 is a transverse section, similar to FIGURE 2, of a modified form of apparatus according to the invention.

Referring to FIGURE 3, there is shown a modification of the apparatus wherein a sleeve 45a is substituted for sheet 45 of the FIGURE 1–2 embodiment, and wherein L-shaped clamps 46a, 47a are substituted for strips 46, 47 of that embodiment, the bolts 60 serving to hold the clamps firmly down against the edge of sleeve 45a. Clamps 46a, 47a each include vertical slots 61 through which the bolts 60 pass so that vertical adjustments of the clamps with respect to bed 40 of pan 20 can be made. Sleeve 45a has upper and lower walls 64, 65, respectively, connected at bends 66, 67 where the sleeve wall is doubled back upon itself to form the edges of the sleeve.

It will be apparent that upper sleeve wall 64 performs the same function as sheet 45 of FIGURES 1–2. Lower wall 65 has, at such locations as inlets 31, 35 of FIGURES 1–2, similar inlets each including a nipple 68 held through wall 65 by flanges 69, 70 clamped or otherwise fixed about nipple 68 at opposite sides of wall 65. When bolts 60 are loosened or removed sleeve 45a may be lifted from bed 40, nipple 68 sliding from the opening of bed 40 through which it is received.

In FIGURE 4 there is shown another modified form of conveyor bed covering wherein a metal or other rigid plate 70 lies flush upon bed 40. A flat flexible sheet or layer 71 is bonded to the upper surface of plate 70 at its longitudinal edges 72, the bond at only one side of layer 71 and plate 70 being shown in the drawing. Pipe nipples 74, only one being shown, are welded or otherwise suitably connected at their upper ends through suitable openings through plate 70 to serve the functions of inlets 31, 35 and outlet 37 of the FIGURE 1 embodiment.

The apparatus as depicted in FIGURE 5 is like that of FIGURE 4 except that the plate 70 is omitted and sheet 71 is edge bonded at both longitudinal edges 72 directly to bed 40.

FIGURE 6 shows, in perspective, the discharge end portion of another form of apparatus according to the invention, employing the sleeve 45a as shown in FIGURE 3. In FIGURE 6, however, sleeve 45a is bonded directly to the upper surface of bed 40 over the lower surface of wall 65 thereof. The sleeve is shown at a condition of emergence or dissipation of a bubble 51 therefrom. The discharge end 75 of the sleeve terminates flush with the end of bed 40, and is open to permit escape of the gas forming the bubble. In this form of apparatus, therefore, no bubble exit analogous to discharge nipple 37 of FIGURE 1, is required. The bubble escapes directly through the material 50 (not shown) which is discharged over the end of wall 64 of sleeve 45a. It should be noted that only inert gas should be used to form the bubbles in this embodiment, since a reactive gas or liquid would contaminate the conveyed material.

The invention, as already mentioned, is adaptable to any conveyor wherein the material conveyed moves or slides over a continuous surface. The invention is additionally applicable to moving belt conveyors, as is indicated in FIGURE 7. In FIGURE 7 a continuous loop belt 80 is moved longitudinally over a plate 81 having upwardly extending side portions 82, only one side portion being shown. Plate 81 extends beneath the belt over a length sufficient for adequate bubble travel beneath the belt to cause freeing of the conveyed material. Spaced from the end of plate 81 which moving belt 80 approaches in its normal direction of travel, so that the belt will lie flat on plate 81 for at least a short distance before reaching it, there is provided an inlet fitting 83 welded beneath a cooperating plate opening 84. Fitting 83 is spaced from the other end of plate 81 by the required distance of bubble travel.

Along each side of plate 81 (only one side being shown) there are provided a plurality of spaced rollers 85 mounted by pins 86 disposed through side 82 openings 87. Rollers 85 bear on the longitudinal edges of belt 80 above plate 81. As will be apparent, rollers 85 permit holding of bubbles 51 beneath belt 80 as the belt moves from fitting 83 to the end of plate 81. Belt movement assists movement of the bubbles beneath the belt in the same direction that the belt travels, and the bubbles discharge as the belt moves off the end of plate 81. Because of the weight of material 50 on the belt, together with the bubble movement with belt movement, there is no tendency for bubble movement in the reverse direction. However, any such reverse bubble movement would not be detrimental, since reverse bubble 51 movement beneath the belt above plate 81 would accomplish the desired result.

While preferred embodiments of the invention have been shown and described, many modifications thereof may be made by a person skilled in the art without departing from the spirit of the invention, and it is intended to protect by Letters Patent all forms of the invention falling within the scope of the following claims:

I claim:

1. A conveyor for moving particulate material having cohesive properties comprising a flexible elongated surface means for supporting said particulate material, means for moving said flexible elongated surface means to convey said particulate material along the longitudinal length thereof, and means for simultaneously moving fluid beneath said flexible surface means flexing said flexible surface means thereby preventing adherence and caking of said particulate material on said flexible surface means.

2. Combination of claim 1, said means for moving fluid beneath said surface means including fluid retaining means beneath said surface means, first passage means past said retaining means permitting entrance of fluid to between said surface means and retaining means, means spaced from said first passage means permitting exit of fluid from between said surface means and retaining means, and means for introducing fluid through said first passage means whereby said fluid flows between said surface means and retaining means from said first passage means to said second passage means causing flexure of said surface means during said flow.

3. Combination of claim 2, said retaining means comprising elongate web means underlying said surface means and connected along its longitudinal edges with the longitudinal edges of said surface means.

4. Combination of claim 2, said fluid introducing means providing intermittent fluid introduction through said first passage means whereby said fluid flow between said surface means and retaining means occurs as spaced fluid bubbles causing intermittent flexure movement across said surface means.

5. Combination of claim 2, said means for moving fluid beneath said surface means also including seal means at spaced portions of said surface means and retaining means enclosing a fluid flow zone therebetween.

6. Combination of claim 5, said seal means comprising means for clamping said portions of said surface means and retaining means together.

7. Combination of claim 1, said fluid being a gas.

8. Combination of claim 1, said fluid being a liquid.

9. In vibratory conveyor apparatus including substantially flat metal bed means and vibratory means for moving material upon said bed means, apparatus for preventing sticking and caking of said material, comprising a flexible layer superimposed over at least a portion of said bed means, means for connecting between side portions of said layer and bed to form a normally closed fluid zone therebetween, fluid introducing means for introducing fluid to said zone at least in one portion thereof, fluid escape means spaced from said fluid introducing means for allowing escape of fluid from said zone, said fluid introducing means being disposed past said bed upstream of said fluid escape means relative the normal direction of material movement by said conveyor, fluid introduced to said zone by said fluid introducing means flowing between said bed and layer causing upward flexure of said layer and freeing of said material upon said layer to escape at said fluid escape means, vibrating movements of said conveyor assisting fluid movement from said fluid introducing means to said fluid escape means.

10. Combination of claim 9, said fluid introducing means introducing fluid intermittently to cause spaced fluid bubble flow therefrom between said metal plate means and layer to said escape allowing means.

11. In moving belt conveyor apparatus including substantially flat bed means and endless loop flexible moving belt means having a portion thereof disposed along said bed means for moving material over said bed means, apparatus for preventing sticking and caking of said material, comprising means for sealing between edge portions of said moving belt and bed to provide a normally closed fluid zone therebetween, fluid introducing means for introducing fluid to said zone at at least one portion thereof, fluid escape means spaced from said fluid introducing means for allowing escape of fluid from said zone, said fluid introducing means being disposed past said bed upstream of said fluid escape means relative the normal direction of material movement by said conveyor, fluid introduced to said zone by said fluid introducing means flowing between said bed and belt causing upward flexure of said belt and freeing said material upon said belt to escape at said fluid escape means, belt movement assisting fluid movement between said fluid introducing means and said fluid escape means.

12. A conveyor for moving particulate material comprising an elongated flat bed, a flexible covering secured to the longitudinal edges and one end of said flat bed, thereby forming an open end between said flexible covering and said flat bed; means for moving particulate material supported on said flexible covering along the length thereof; and means for intermittently generating and transmitting a series of travelling fluid bubbles along the length of said flat bed between said flat bed and flexible covering, said fluid bubbles being of substantially the same width as said flat bed and travelling toward said open end causing pulsating flexure of said flexible covering thereby preventing caking and sticking of said particulate material.

References Cited in the file of this patent

UNITED STATES PATENTS

| 756,600 | Dodge | Apr. 5, 1904 |
| 2,478,326 | Scarth | Aug. 9, 1949 |
| 2,795,318 | Morris | June 11, 1957 |

FOREIGN PATENTS

| 522,121 | Italy | Mar. 31, 1955 |
| 1,057,973 | Germany | May 21, 1959 |